(12) United States Patent
Foltz et al.

(10) Patent No.: US 7,725,857 B2
(45) Date of Patent: May 25, 2010

(54) METHOD FOR OPTIMIZING ORGANIZATIONAL FLOOR LAYOUT AND OPERATIONS

(75) Inventors: Christopher Foltz, Poughkeepsie, NY (US); Sreekanth Ramakrishnan, Wappingers Falls, NY (US); Michael V. Teslani, Vestal, NY (US)

(73) Assignee: International Business Machines Corporation, Armonk, NY (US)

( * ) Notice: Subject to any disclaimer, the term of this patent is extended or adjusted under 35 U.S.C. 154(b) by 449 days.

(21) Appl. No.: 11/737,309

(22) Filed: Apr. 19, 2007

(65) Prior Publication Data

US 2008/0263491 A1 Oct. 23, 2008

(51) Int. Cl.
G06F 17/50 (2006.01)
(52) U.S. Cl. .............................................. 716/8; 716/2
(58) Field of Classification Search ..................... 716/2, 716/8; 52/79.1; 700/83
See application file for complete search history.

(56) References Cited

U.S. PATENT DOCUMENTS

| | | | |
|---|---|---|---|
| 4,408,291 A * | 10/1983 | Gunzberg et al. ........... 700/115 |
| 6,282,455 B1 | 8/2001 | Engdahl |
| 6,748,704 B2 | 6/2004 | Eguchi et al. |
| 6,886,153 B1 * | 4/2005 | Bevis .......................... 716/19 |
| 7,363,137 B2 * | 4/2008 | Brant et al. ................... 701/50 |
| 2002/0054101 A1 | 5/2002 | Beatty |
| 2006/0026558 A1 | 2/2006 | Beringer et al. |
| 2006/0169415 A1 | 8/2006 | Lawson et al. |

* cited by examiner

*Primary Examiner*—Sun J Lin
(74) *Attorney, Agent, or Firm*—Scully, Scott, Murphy & Presser, P.C.; Steven Bennett, Esq.

(57) ABSTRACT

A computer-automated method for analyzing an organizational floorplan layout, and making recommendations for modifying the layout to optimize productivity, and efficiency of operations conducted within the modified layout includes the following method steps. Gathering raw performance measure date comprising performance measures known to quantify the floorplan layout productivity and efficiency of operations, performing statistical analyses on the raw performance measure data and comparing different areas in the floorplan layout using results of the statistical analyses, and generating proximity data as a result of the comparing. The method includes comparing different resources needed to carry out planned operations, including using results of the statistical analyses, and their interdependencies, calculating and evaluating costs associated with operating in accordance with floorplan layout, including using the resources allocation data, and transportation methods and by generating cost data as a result calculating and evaluating. As a result, opportunities for modifying the layout are identified and recommended, which may be used in their entirety or in part to improve operation efficiencies and effectiveness.

20 Claims, 11 Drawing Sheets

RATING BASED ON "COST OF MOVEMENT/ RELOCATION"
COST FACTOR
   LOW - 1
   MEDIUM - 2
   HIGH - 3

ADD A RISK FACTOR (OPTIONAL) TO THE COST FACTOR
ADDER OF 2 TO THE COST FACTOR

1 → LOW COST
2 → MEDIUM COST
3 → HIGH COST
2+2 → MEDIUM COST + RISK
3+2 → HIGH COST + RISK

FIG. 8B

FIG. 9

METHOD FOR OPTIMIZING ORGANIZATIONAL FLOOR LAYOUT AND OPERATIONS

BACKGROUND OF THE INVENTION

1. Field of the Invention

The present invention relates to organizational layouts, such as physical dimensions and relationships that limit required organizational operations carried out therein, and more particularly relates to a method for automatically analyzing an organizational floorplan layout, including, the interrelatedness of operations conducted therein in a form of a set of tangible measures, and providing analysis results and recommendations for modifying the floorplan layout to improve organizational operation in accordance thereto, in response to changing organizational or market conditions.

2. Background Art

Today's consumer markets for organizational services, such as centralized health care services, and industrial and consumer products produced by manufacturing organizations are extremely competitive, particularly in the US. To remain competitive in today's complex and changing markets compels service providers and manufacturers to find new and innovative ways for increasing productivity organization and enterprise-wide, including being responsive to market changes and changing services and product demand needs. Doing so includes creating and maintaining organizational floorplan layouts, e.g., working environments or environments in which customer or other public care and services are provided, that are ergonomically sound and efficiently laid out for efficient and effective resources movement. But many such organizations utilize the same floorplans or floorplan layouts, and organization operationally around the layouts, some combination of which being in operation from a time of the location's beginnings. While such traditional organizational floorplan layouts, e.g., manufacturing plant layouts such as a semiconductor fab or hospital emergency room, certainly get a patient processed or a manufactured product shipped at the end of a manufacturing cycle, but are not designed for optimized productivity and resource throughput. Subsequently, the patient or product experience through the system is less than ideal and can result in diminished operating efficiencies and a lower customer satisfaction.

Many presently active organizational floorplan layouts such as manufacturing plant layouts and designs are not designed so that operations conducted therein can be executed in accord with basic ergonomic principles, or otherwise optimally executed. Such conventional layouts and designs are not readily responsive to the dramatic changes we see so frequently in today's markets for manufactured goods, or application of institutional services, in US and worldwide markets. This is particularly so for those floorplan layouts that have developed over an extended number of years where evolving institutionalized services are provided, e.g., an airport, or industrial and consumer products are manufactured, e.g., a and manufacturing plant, where many obvious and not so obvious variables qualify overall organizational operational efficiency and therefore productivity and effectiveness.

Optimizing productivity lends itself to optimized profitability in today's competitive markets for finished products and manufactured goods. Optimized productivity can also mean being more responsive to changing customer demands or changes in the market. To improve or optimize productivity, investigations are undertaken to identify improvements and upgrades to floorplan layout and organizational activity conducted in such layout. Due to the numerous variables that influence productivity, such investigations tend to be complex and time consuming. And without analytical results, identifying best practices and layout for realizing optimized organizational, e.g., plant, resources management, and therefore optimized productivity cannot be determined.

Organizational floorplan layout and operational optimization tools are known. For example, manufacturing plant operational analyses are known to be conducted by plant management or organizational management within traditional manufacturing plants in attempts to optimize operations;, 'Optimizing' an organizational floorplan layout, and organizational operations conducted thereon is fundamental to achieving increased organizational productivity. For example, optimizing a manufacturing plant floorplan layout so that resources required for manufacture are delivered to various layout stations optimally, used optimally for particular operations, and reflect sufficient flexibility for modification to ensure smooth resources flow, human and material, realizes an end service or product that has been produced or provided more efficiently, and presumably, therefore, more competitively.

An optimal plant or service organizational location floorplan layout must be adaptive and responsive to service demand cycles, e.g., registration at a college campus location, and product manufacturing cycles within a manufacturing plant floorplan layout. Manufacturing cycles as used herein includes engineering models, and plans for manufacturing finished products, including raw material requirements (if applicable) and processes required to modify the raw material to the finished product. For that matter, and for matters of explanation purposes, nature of the invention, and its inventive applications will be described in particular detail herein with respect to the invention as it can be applied to manufacturing plant layout, and their modification or re-layout in order to optimize their operation.

Such manufacturing plant layout, and descriptions of the invention with respect thereto, however, are for explanation purposes, and is not meant to limit in any way the scope of the invention. Manufacturing plant floorplan layout, and manufacturing operations carried out within the confines of such layouts) are quite complex. The skilled artisan and reader alike should readily see that the inventive principles set forth and described with respect manufacturing plant floorplan layout, and operations therein, and recommendations for floorplan re-layout, may be readily applied to any organizational floorplan layout that could benefit by the inventive analysis and recommendations for improvement. Whether it is a manufacturing plant floorplan layout, a hospital emergency room, or a public library organizational floorplan layout, if it is designed or redesigned in a way that provides such operational adaptivity and responsiveness to changing market forces, and subsequent changing manufacturing or service cycles will result in optimizing productivity and profitability of the organization.

Manufacturing facilities designed in accord with basic ergonomic principles, and with sufficient flexibility and responsiveness to changing market conditions for the products under manufacture are found to reduce overall manufacturing cycle time and costs, ensuring faster time to market. Key performance measures for qualifying optimized manufacturing plant operation include example, effective manufacturing resources utilization throughout a manufacturing cycle, effective and/or improved manufacturing throughput and manufacturing cycle times. For that matter, to enable and maintain ergonomically designed manufacturing processes, it is paramount to design an ergonomically proper physical plant within which the processes would be carried out.

Various papers have been published concerning techniques for optimizing manufacturing plant layout. Several of these include: Balakrishnan, K., "Integrating simulation and design of experiments to identify factors for layout design", *M.S. Thesis*, Cincinnati, Ohio, University of Cincinnati (2000); Canen, A. G., Williamson, G. H., "Facility layout overview: towards competitive advantage", *Facilities*, Vol. 16, No. 7/8 (1998), pp. 198-203; Kerr, D. C., Balakrishnan, J., "Manufacturing cell formation using spreadsheets", *International Journal of Operations & Production Management*, Vol. 16, No. 9 (1996), pp. 60-73; Levary, R. R., "Re-engineering hospital emergency rooms: an information system approach", *International Journal of Health Care Quality Assurance*, Vol. 10, No. 5 (1997), pp. 179-191; Sha, D.Y., Chen, C. W., "A new approach to the multiple objective facility layout problem", *Integrated Manufacturing Systems*, Vol. 12, No. I (2001), pp. 59-66; Tompkins, J. A., White, J. A., Bozer, A. Y., Tanchoco, J. M. A., *Facilities Planning*, Wiley Publishers, 3$^{rd}$ Edition, New York, N.Y. (2002); and Wilde, E., "Functional Planning", *Facilities*, Vol. 14, No. 7/8 (1996), pp. 35-39.

Computer-based methods and techniques that attempt to optimize manufacturing plant layout and organizational operations conducted thereon are known, including various manufacturing plant floorplan layout software tools and applications. Manufacturing operation-planning tools, and manufacturing plant layout tools attempt to locate (or place) machines for manufacture within a plant layout or location, and attempt to locate the manufacturing operations with an objective of reducing the distance traveled to implement each operational stage. But such conventional layout design and redesign tools are limited in effectiveness. For example, if a product under manufacture requires a number of different parts types, planning tools would focus only upon the task of bringing the parts together, but typically ignore other factors that could be implemented to affect the operation. Other factors might include optimizing batch sizes of required parts, optimizing transport modes for the manufacturing (assembly) process, and optimizing manufacturing resource and capacity allocation during the manufacturing process.

Conventional manufacturing plant layout and organizational tools are not known to consider such factors as manufacturing floor distances, frequency (timing) of a particular operation, manufacturing batch sizing, mode of transport, resource utilization, etc., that might be required during manufacturing processes. For that matter, most conventional or known software tools do not consider manufacturing cost, or resource/capacity allocation for a particular manufacturing process, or such factors affecting plant operation as a whole, but provide only ready-to-use results. They are not geared to providing re-layout optimization suggestions.

For that matter, various US patents are known that disclose manufacturing plant floor planning and layout application software, which attempts to provide optimization solutions for manufacturing plant layout and operations. For example, published pending U.S. Patent Application No. 2002/0054101 ("the '101 application"), filed May 29, 1998, and incorporated by reference, discloses a graphical user interface shop floor control system that graphically represents a manufacturing plant, including individual production machines, storage locations, offices and other pertinent areas, and elements of the plant and its operation. Selectable icons are used to represent the individual factory elements. A macro or function included with the '101 application allows user access to a number of different plant schedules, statistical analyses, supplies and inventories, etc., at varying levels of detail. The disclosed technique(s), however, do not appear to do more than provide a framework for simulating certain manufacturing plant layout, and organizational operation. That is, the methods disclosed, in the '101 application do not provide functionality for improving or optimizing a manufacturing plant layout to optimize production therein.

Published, pending U.S. Patent Application No. 2006/0026558 ("the '558 application"), filed Jul. 19, 2005, and incorporated by reference, discloses a computer method and apparatus for automatically generating hybrid contextual floorplans, or floorplan layouts for object instances. The method provides a user interface for operational business entities where data relating to a process instance and data related to an object instance are managed uniformly. The method also provides a process view and object view of the manufacturing process and manufactured object, respectively. The invention disclosed in the '558 application, however, does not appear to do more than provide a user interface that offers a hybrid view of instantiated objects (products) or processes (manufacturing processes and operations) in a plant layout. The '558 application does not disclose functionality for improving or optimizing a manufacturing plant layout in such a way that the various processes implemented to manufacture the finished product are optimized.

Such known optimization tools are typically fast in execution, using algorithms that attempt identify "optimal" solutions, but as mentioned tend to be based in "black-box" approaches to optimization in practice, providing little insight into methodologies that may be adopted for obtaining the touted "results." And such conventional tools do not account for multiple variables that affect or determine optimized proximity in a floorplan layout. Conventional tools also do not allow for intermediate or incremental improvements to be made, in that the optimal solution tends to be an "all or nothing" proposition. Proximity, as used herein, is meant as a yardstick for measuring shared resources, or the shareability of resources for manufacturing operations with respect to spatial limitations and mobility attributes (transportation methods) of a layout.

Shared resources in manufacturing operations carried out in a floorplan layout might include without limitation shared tooling, shared transport type, sharing the various costs associated with various manufacturing processes, etc. But before "meat and potatoes" processing that such known optimization tools and software are intended to conduct may be carried out, significant programming efforts must be undertaken to customize the data and information to the requirements of a domain, e.g., a plant layout. That is, the use of conventional tools such m discussed above requires that data sufficient to represent the salient details of the proposed manufacturing processes or plant layout must first be provided, or made accessible to the process.

What would be welcomed in the art of organizational floor layout planning and design, and re-design or layout, is an application software tool that analyzes data defining the organizational floorplan layout, and the operations to be conducted thereon, and make recommendations for innovative ways of modifying or implementing the floorplan layout to optimize productivity of operating in accordance thereto, including being able to optimally respond to particular operational needs to increase operational efficiency and reduce operating costs.

SUMMARY OF THE INVENTION

The present invention comprises an automated method for making calculated recommendations for optimizing an organizational facility floorplan layout, for example, a manufacturing plant floorplan layout. The recommendations are calculated by the invention using a set of data comprising particular key performance measures that qualify and quantify operations within a layout, or operational efficiency.

In a first embodiment, the invention includes a computer-automated method for analyzing an organizational floorplan layout, and making recommendations for modifying the layout to optimize productivity, and efficiency of operations conducted within the modified layout. The novel method includes gathering raw performance measure data comprising performance measures known to quantify the floorplan layout productivity and efficiency of operations, performing statistical analyses on the raw performance measure data, comparing different areas in the floorplan layout, and generating proximity data as a result of the comparing, and comparing different resources needed to carry out planned operations, and their interdependencies. The method then includes calculating and evaluating costs associated with operating in accordance with floorplan layout, and generating cost data as a result calculating and evaluating, identifying opportunities for modifying the layout based and recommending layout modifications based on the identified opportunities.

The set of data comprising the key performance measures is gathered for use by the inventive method in any manner known by the skilled artisan. The recommendations comprise suggested modifications to an organizational floorplan layout under analysis that are known to improve and optimize various operations conducted under the floorplan layout (or re-layout), as well as optimizing overall efficiency. The reader should note that the recommendations provided by the invention are derived from an analysis of an aggregate of factors of measures, and their statistical interrelatedness, which defines layout functionality. That is, the unique combination of the aggregate measures analyzed, as distinguished from the measures individually, enable the inventive operation by way of a recommended layout, or recommendations for modifying a layout that will provide optimized operations conducted thereon, for example, a patient's processing or a manufacturing task cycle from start to finish. The particular factors or measures that are statistically analyzed during inventive operation include without limitation distances that must be traversed to complete operations, frequency of operations, batch sizes (with respect to manufacturing organizations), modes of transport, for example, patients, parts, finished products, etc., cost of operations and resource/capacity allocation.

The novel automated method may comprise a set of software or computer readable instructions that may he provided to a general purpose computer for execution therein, which general purpose computer has access to data defining and/or relating to an organizational floorplan or layout. The automated method implemented by the computer operates upon the data comprising the aforementioned measures, and generates the suggestions and recommendations for modifications that if implemented to modify the layout will result in optimizing efficiency and productivity of the organizational operations carried out therein.

In another embodiment, the novel method for optimizing an organizational floorplan layout is directed to a manufacturing plant floorplan layout. The novel optimization method efficiently and effectively identifies and analyzes the particular measures/factors that affect (quantify) layout, efficiency, and recommends layout and re-layout modification measures understood to optimize or improve the measures if implemented. The output information provided by the novel method for optimizing is arranged preferably in a form of a proximity interrelationship matrix, and proximity index, which may he provided for user viewing. The proximity index matrix makes comparisons between all possible combinations of area-to-area interactions that may be performed in the layout under analysis. The proximity index indicates the opportunities for re-layout between the areas compared.

The recommendations are presented for viewing as sort of a "one-stop-shop." A one-stop shop is a view or summation in a user interface, or screen shot generated by the invention to highlight, where possible, each and every operation included in an organizational system, e.g., a manufacturing system, for consideration in the optimization, and a value realized by making a modification associated with improving the individual operation efficiency. One example of a factor for consideration includes proximity of designated operational stations to complementary station locations, and the effect proximity of such operational stations has on overall operational activity.

The novel proximity interrelationship matrix of this invention, and its operation, requires particular data input in a form of critical measures which when analyzed in the aggregate in accordance with the statistical analyses implemented, qualify a layout under study, and the possible opportunities for improving the layout. The proximity interrelationship matrix and its associated proximity index communicate the state of the layout under investigation by way of the measures and factors with respect to current proximity of operations, and proximity of needs for material and human resources, and their respective availability vis-à-vis operational stations and areas, and their interdependencies. Interdependencies may include without limitation resources sharing and dependencies, transportation, costs for raw materials, products, patient or personnel transport, ease of relocation of scheduled operations or task in view of changed requirements (such as due to changing market factors as mentioned above), and optimization opportunities with in the layout.

BRIEF DESCRIPTION OF THE DRAWING FIGURES

The foregoing and other objects, aspects and advantages will be better understood from the following detailed description of embodiments of the inventions, with reference to the drawings, in which.

DETAILED DESCRIPTION OF THE INVENTION

The novel method for optimizing an organizational floorplan layout, e.g., manufacturing floorplan layout, and application software that implements the method as set forth and described herein analyze a set of measures that qualify a layout to generate and provide recommended solutions for modifying the floorplan to optimize organizational operations thereon, and therefore optimize organizational productivity and efficiency of operations therein. The recommended solutions and operational performance measures from which the solutions are calculated by the invention in the aggregate reflect the operating efficiency of a particular floorplan layout under investigation.

The floorplan layout performance measures are critical to quantifying the efficiency of the organizational operations. The data comprising the measures, or set of data comprising the key performance measures may be gathered for use by the inventive method in any manner known by the skilled artisan. The performance measures include such operational variables as the distances required to be traveled by parts or personnel to implement one or more operations in the floorplan layout under analysis, the frequency of the operations, manufacturing batch sizes (in the case of a manufacturing plant), modes of transport for carrying out operations, operational process costs and resource/capacity allocation per operation, etc. These and like performance measures, when processed together by the invention, quantify the productivity of organizational operations, and provide the basis for making the recommendations for modifying the layout. That is, by analyzing the critical operational performance measures together, in the aggregate, the invention can make its educated recommendations for layout optimization. To that end, the invention provides a unique user interface for viewing the analysts results and recommendations in various screens, including a screenshot that summarizes the analysis results and recommendations in one clear view.

The novel method of the invention is readily integrated and scalable with known organizational layout design and re-design tools in order to conduct more complex analyses. For example, the data output or analysis results may be a useful starting point for a more detailed analysis of a layout and operations, or problems related thereto, such results including without limitation data comprising the novel proximity inter-relationship matrix, proximity index defining proximity of operations and material resources, area or process (operational) interdependency, resources sharing and resources dependencies, transportation costs for raw materials and finished products, patient or personnel transport, ease of relocation of a scheduled operation or task, and optimization opportunities.

Key functions of the novel FLOW Matrix method for optimizing an organizational floorplan layout include the implementation and use of the aforementioned proximity interrelationship matrix (PIM) and proximity index (PI) functionalities. These functional operations support analysis of efficiency of an organizational floorplan layout using area-to-area or station-to-station comparisons. Based on the comparisons, the invention makes recommendations for modifying the floor layout to optimize the physical proximity of the operational task sites.

The PI function is of great benefit to the inventive operation in that it generates a readily useable report by which end-users can readily understand the impact of varying layout features, for example, to shorten or optimize lengths or distances that must be traversed to carry out the required organizational operations. The PI matrix provides a summary of relevant proximity factors and recommended modifications by way of alphanumeric indicators. The alphanumeric indicators function to identify the appropriateness, and the potential benefit or improvement in the critical measures that result from varying the distances necessarily traveled by human and material resources between operational stations, and to execute the various organizational operations.

A second key function automatically analyzes the organizational floorplan layout to assess measures that affect sound ergonomics, which way include floor distances that must be traversed to implement an operation, raw material resources delivery distances, frequencies of operations, operations transport types, operational costs, etc. A third function or benefit of inventive operations lies in the completely automated nature of the novel method, and in view of the fact that the invention generates its useful outputs using an engine that requires very limited manual calculation. A fourth or simulation function provides for seamless integration and simulation modeling of proposed modifications to a floorplan layout, or re-layout. The function's simulated outputs may be used as inputs to other simulation model tools for simulating "works in progress (WIP)", manufacturing cycle times and operational throughputs that would result form the recommended modifications.

A fifth function, referred to as an "ease of understanding results function," provides the analysis results to the user via a readily understandable user interface. That is, the ease of understanding results function provides a snapshot summary in one clear view of all of the relevant design optimization factors, and the results of the suggested modifications to the floorplan layout operation as a result of the suggested modifications. The reader and the skilled artisan alike should note that while conventional floorplan layout and optimization tools use "black-box" approaches to present their calculated solutions, such conventional optimization approaches generally provide end users with a limited insight into the methodology behind their automatically generated results (or suggestions), thereby making it nearly impossible to make progressive and incremental improvements to a layout or operational flow. The novel "ease of understanding results" function does not rely upon such conventional black box approaches, but provides the end-user with a global or systemic view of all of the relevant analysis results.

A sixth function maybe described as an "ease of use and scalability" function, which comprises various modules or sub-functions that are readily self-explanatory to the user. The ease of use and scalability function provides "easy-to-use" user interfaces for conveying the results and recommendations to the end users, including any updates to the organizational floorplan layout under review, and further provides that the inventive operation is scalable. The scalability is dependent upon the number of areas or stations that an organizational floorplan includes, and the particular critical measures utilized.

Figure 1A:
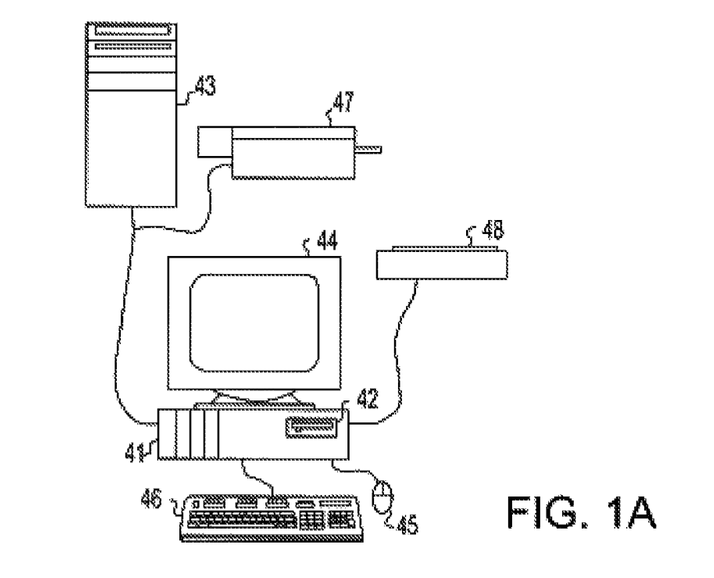
FIG. 1A shows a computer system that may be used to carry out this invention.

The method of the present invention will be generally implemented by a computer executing a sequence of program instructions for carrying out the steps of the method and may be embodied in a computer program product comprising media storing the program instructions. Referring to FIG. 1A, a computer system 40 is depicted on which the method of the present Invention may be carried out. Processing unit 41, houses a processor, memory and other systems components that implement a general purpose processing system that may execute a computer program product comprising media, for example a floppy disc that may be read by processing unit 41 through floppy drive 42.

The program product may also be stored on hard disk drives within processing unit 41 or may be located on a remote system 42 such as a server 43, coupled to processing unit 41, via a network interface. such as an Ethernet interface, Monitor 44, mouse 45 and keyboard 46 are coupled to processing unit 41, to provide user interaction. Scanner 47 and printer 48 are provided for document input and output. Printer 48 is shown coupled to processing unit 41 via a network connection, but may be coupled directly to the processing unit. Scanner 47 is shown coupled to processing unit 41 directly, but it should be understood that peripherals may be network coupled or direct coupled without affecting the ability of workstation computer 40 to perform the method of the invention.

As will be readily apparent, to those skilled in the art, the present invention can be realized in hardware, software, or a combination of hardware and software. Any kind of computer/server system(s)—or other apparatus adapted for carrying out the methods described herein—is suited. A typical combination of hardware and software could be a general-purpose computer system with a computer program that, when loaded and executed, carries out the respective methods described herein. Alternatively, a specific use computer, containing specialized hardware for carrying out one or more of the functional tasks of the invention, could be utilized.

The present invention, or aspects of the invention, can also be embodied in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

Figure 1B:
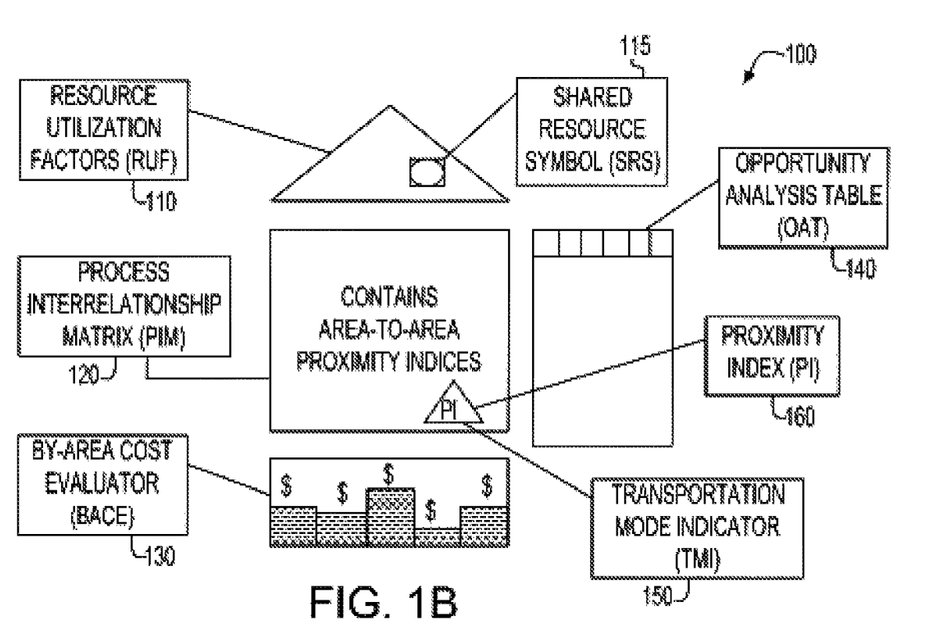
FIG. 1B is a system functional description of one embodiment of a novel method for optimizing organizational or manufacturing floorplans, and floorplan layouts of this invention.

FIG. 1B herein depicts the high-level functional structure 100 of a first embodiment of a novel method for optimizing an organizational floorplan layout of this invention, e.g., a manufacturing floorplan layout. The novel method functionalities, as described above, include a resource utilization factors (RUF) function 110, a process interrelationship matrix (PIM) function 120, a by-area cost evaluator (BACE) function 130 and an opportunities analysis table (OAT) function 140. RUF function 110 includes a shared resources symbol (SRS) function 115. PIM function 120 implements or includes the use of a transport mode indicator (TMI) module or function 150, and proximity index (PI) module or function 160.

Re-layout opportunities are identified by PIM 120 with respect to the layout locations (stations) under analysis. For example, the opportunities may be identified with respect to areas or stations of relatively "far" proximity, and at which are implemented a relatively "high" number of interactions between proximate areas or stations. Alternatively, the opportunities may reflect a relatively "close" proximity, at which a relatively "low" number of interactions are implemented between them.

Resource Utilization Factor (RUF) module or function 110 identifies and presents for end-user review an indication of the interdependency of resources required to implement the organizational operations intended to carried out in accorded with the layout or re-layout. For example, the RUF qualifies the layout or re-layout with respect to the proximity of human assets, fixed assets, etc., between stations and intended organizational operations. Unique symbols are used by use RUF module via a shared resources symbol function or module 115. The shared resources function 115 is called by the RUF function to qualify proposed interaction between various areas or stations, or operations that share common resources. Areas with shared resources, either human resources, equipment resources, tooling resources, etc., should have a close proximity to one another to optimize efficiency of operations therebetween.

To accommodate this rule or premise, the shared resources function 115 provides a set of resource utilization descriptors for use by the novel optimizing method and application software of this invention that includes the following indicators: shared human resources

, shared equipment and/or tooling

, shared human resource and equipment

.

The symbols are readily viewed and understood, and enable a layout evaluator to assess the proximate distances between stations in the facility under study based on the evidenced needs and benefits of the proximate interrelationships with respect to optimized productivity by the sharing of the resources. The novel approach also systematically quantifies these shared resource relationship and arithmetically adjusts the proximity index (PI) to denote this relationship.

The By-Area Cost Evaluate (BACE) module or function 130 calculates the total transportation costs for an operational area or station within the floorplan layout, and compiles a matrix of the costs for presentation to the end-user. For example, BACE function 130 calculates the costs for the current state of a planned organizational floorplan layout for comparison with costs calculated for the same operations after modification, that is, in various proposed re-layout scenarios. The BACE function 130 uses the TMI symbols provided or defined by the proximity matrix (PI) to present the results of such evaluations. By doing so, the end-user is presented with the relevant information needed to decide on a modification, for example, the expected costs and benefits that may be realized by implementing the recommended "re-layout" options. For example, transportation costs identified with various or possible transportation modes for use in a layout or proposed layout are presented for the end-user viewing and consideration.

Opportunity analysis table (OAT) or functional module 140 identifies and presents to the layout evaluator any available opportunity for improvement to an existing floorplan layout, based on the critical measures. Opportunities derived from the PIM 120 are identified in the OAT 140, which is segmented into two halves in the embodiment shown. One half of the OAT identifies those areas that have a close proximity but do not require it for optimized operation. For example, the PI rates or qualifies opportunities using alphanumerics (PI=1A, 1B, 2C). The other half of the OAT module identifies areas or operational stations that do not have a close proximity hut require it for optimal operation, for example (PI>=3C). A tally of the number of opportunities for an area is calculated and communicated to the end-user by the invention. The opportunities are organized and color-coded by the ease or difficulty of relocating an area through a factory re-layout.

And as mentioned above, PI function 160 (and the PI itself) compares two different areas within a floorplan layout, e.g., different operational stations, and provides the comparison results in useable form. All possible combinations of area-to-area comparisons are simulated for the entire plant or other organizational facility, and presented, as the PI in the alphanumeric pairing as mentioned above. Opportunities for layout modification are highlighted for all relevant areas within the floorplan layout and/or re-layout. The highlighting allows for all re-layout opportunities and their concomitant improvement in operating efficiency to be readily understood by the end-user, preferably in one single aggregate view or screen shot. And as mentioned, the proximity Index (PI) indicates the "nearness" of two areas by using an alpha rating from "A to B," where an "A" rating may he understood to indicate a "close" proximity, and a rating of "E" indicates a "far" proximity relative to the entire scope of the area(s) under investigation, i.e., the entire factory or hospital facility. Statistical calculations are performed by the PI function to ensure that all distances are distributed evenly, and rated by a scale of 1 to 5. That is, ordinal PI ratings of 1 through 5 are determined by the need for closeness of an operation or station.

Figure 2:
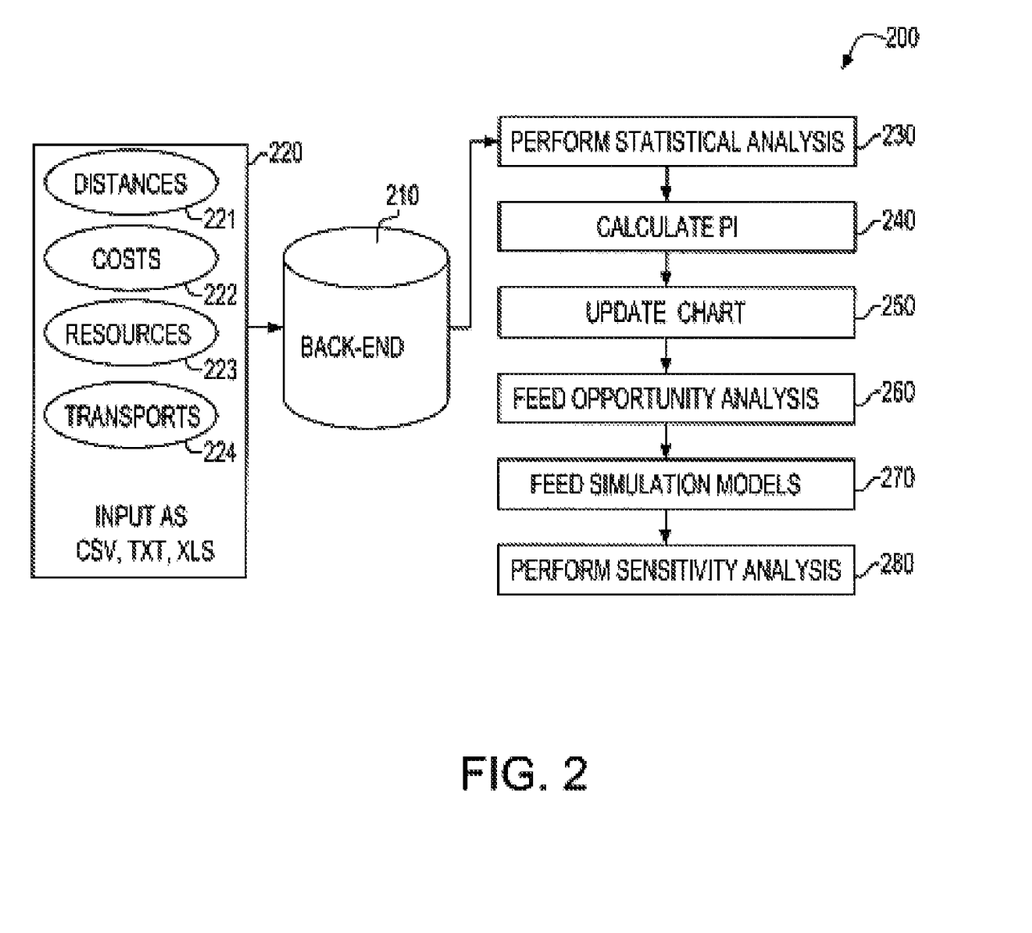
FIG. 2 is a schematic flow diagram of the functional operations implemented by the novel method for optimizing organizational or manufacturing floorplans, and floorplan layouts of this invention.

FIG. 2 herein depicts the high-level functional flow 200 of the novel method for optimizing an organizational floorplan layout, or re-layout. Functional flow description 200 is shown to include a processing back-end or engine 210, which operates to control the overall system operational flow of the novel method. The processing engine may comprise a general purpose computer, for example, a personal computer, or signal processor are with a set of computer readable instructions that when operated upon and executed by the computer carry out the novel method of this invention. Processing engine 210 operates upon a factors database 220, which maintains data for distances 221, costs 222, resources 223, tooling and transport 224 and frequency of operations 225. These data are provided to the processing engine 210 in a form of text or CSV files. Once the data is fed into the corresponding tab, the processing engine 210 performs a statistical analysis to determine the groupings.

The step of performing the statistical analysis is identified as block 230 in FIG. 2. Thereafter, a step of calculating the PI is identified as block 240 in the figure. Block 250 represents a step of updating the charts and matrices, and block 260 represents a step of feeding opportunity analyses. Block 270 represents a step of feeding simulation models, and block 280 represents a step of performing a sensitivity analysis. The sensitivity analysis determines the groupings. The same activities are repeated for other input data as well.

Figure 3:
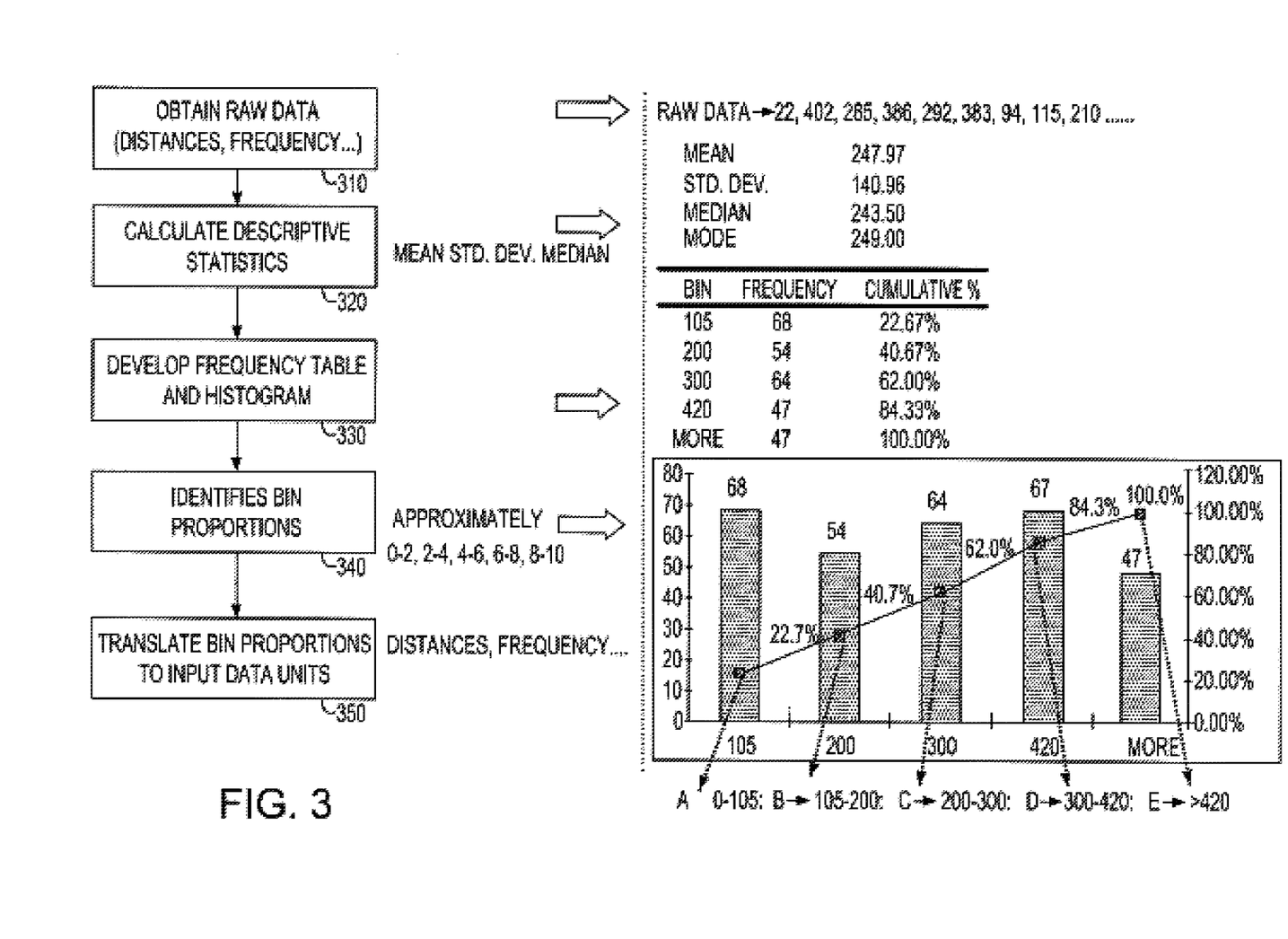
FIG. 3 is a logical flow diagram of various functions, which includes a view of the raw data each function operates upon.

FIG. 3 shows the processing flow of the raw data on the left-hand side of the figure, and the processing results or data in the right side. Just under the raw data shown are the statistical results of the processing, the frequency table and histogram, the bin proportionality and the translated bin proportions as data inputs units. The same activity is repeated for other input data as well as the aforementioned data. Block 310 represents obtaining raw data, block 320 represents calculating descriptive statistics, block 330 represents developing the frequency table and histogram. Block 340 represents identifying bin proportions and block 350 represents translating bits proportions to input data units. FIG. 3 shows the processing results of blocks 230, 240, 250, 20, 270 and 280 of FIG. 2. For example, raw data is shown in the upper right of FIG. 3.

Figure 4A:
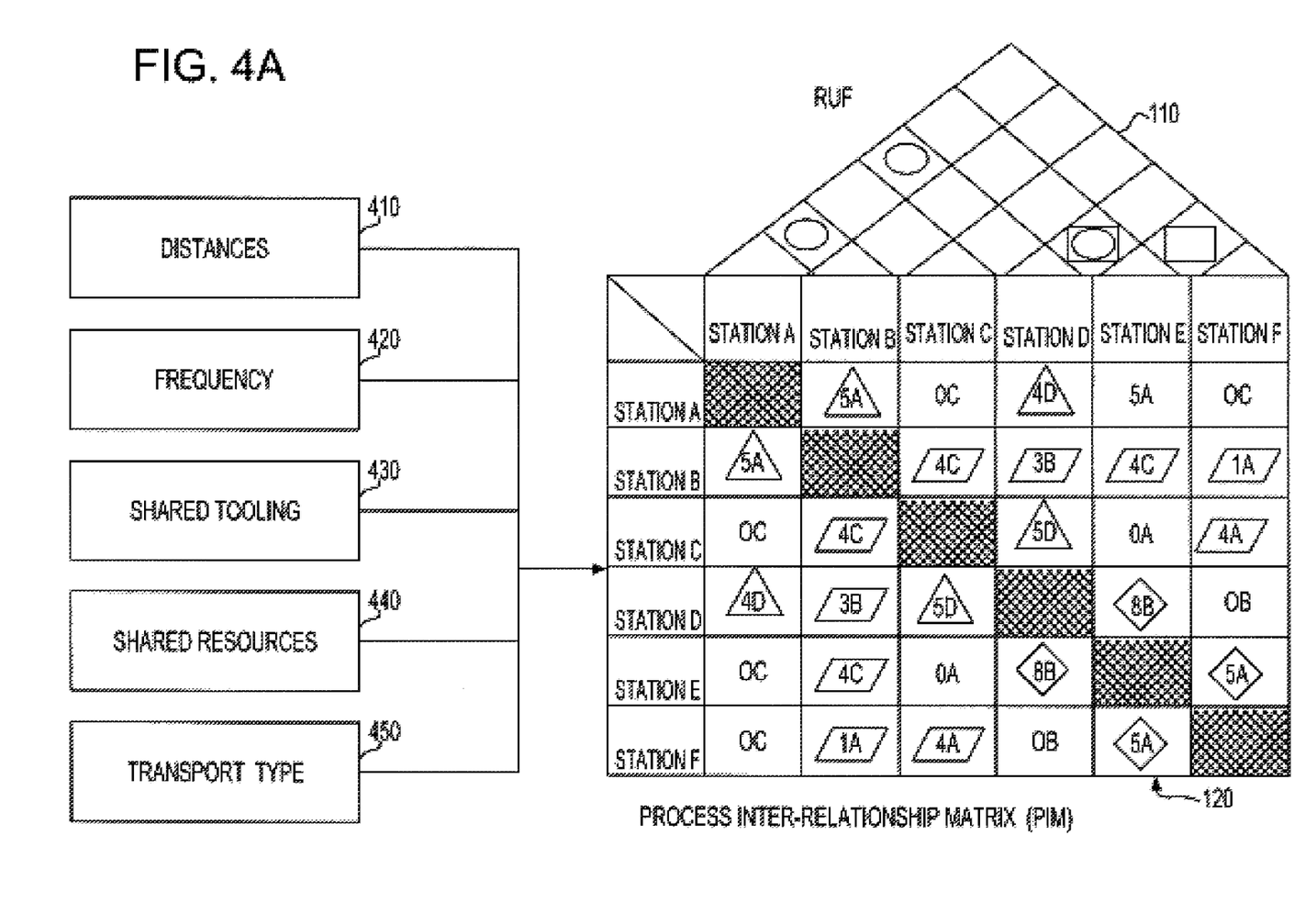
FIGS. 4A and 4B together depict the novel process functions and a view of the related interrelationship matrix (PIM), which PIM displays several shapes relating to factors affecting flow transport.
Figure 4B:
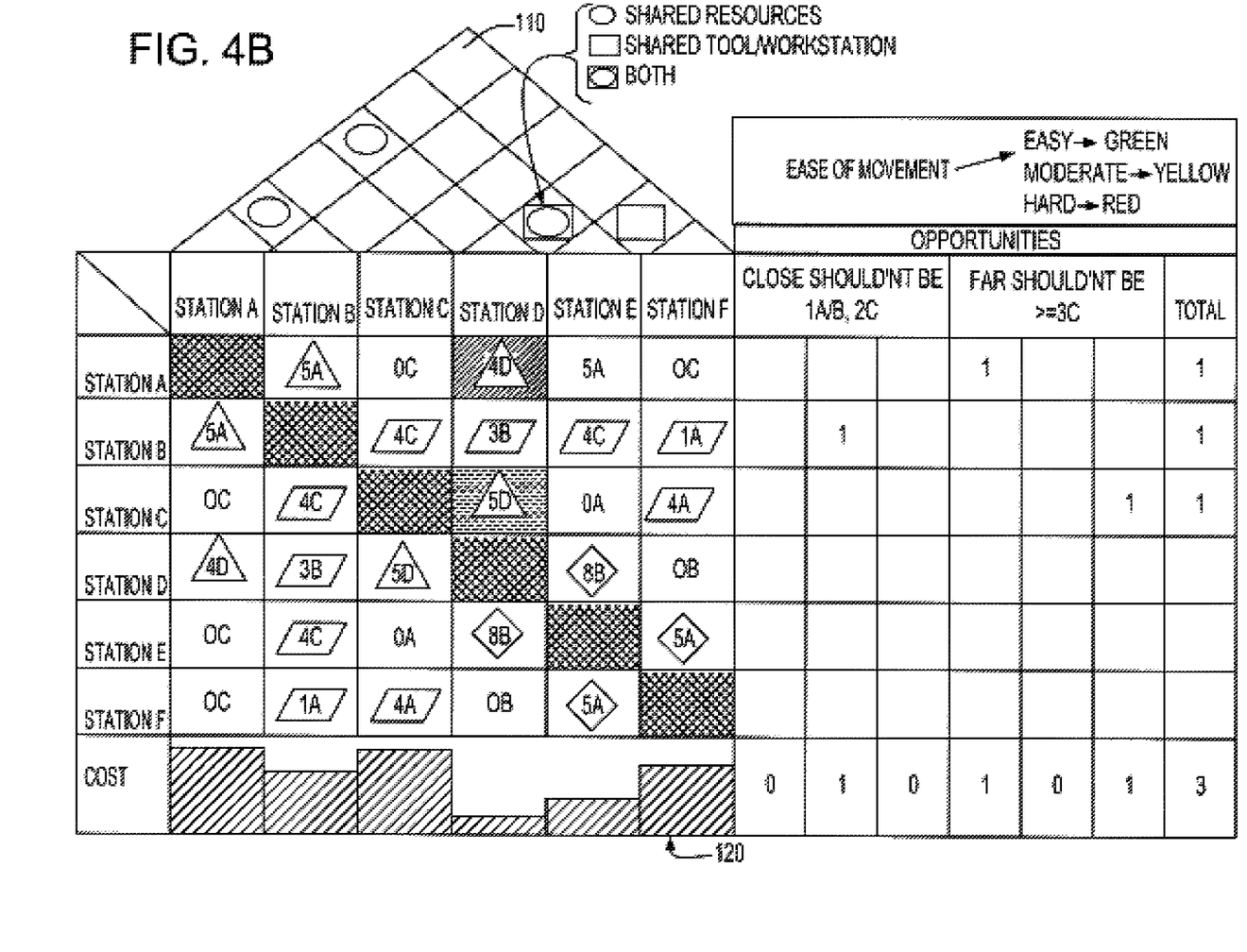

FIGS. 4A and 4B together highlight the proximity interrelationship matrix (PIM) 120 and RUF 110 operation. In the PIM 120, each of distances 410, frequency of operations 420, shared tooling 430, shared resources 440 and transport mode 450, are recorded in their individual tabs (as shown in the figure). The novel optimizing method executes these functions to determine which "bins" to group known distances traversed to carry out particular operations, to determine the frequency of operations, etc. For the various transport modes, visually recognizable shapes are generated and used to identify the various transport types. The shapes are generated within TMI function 150, which as mentioned is included as part of PIM function 120. Examples of available transportation might include conveyor transport, transport by hand, transport by hand truck, etc., as shown in Table 1.

TABLE 1

| TMI Symbols: | |
| --- | --- |
| ▲ | Truck, Fork Truck, Donkey, etc. |
| ▨ | Hand carry, cart, hand truck, etc. |
| ◆ | Conveyor |

Figure 5:
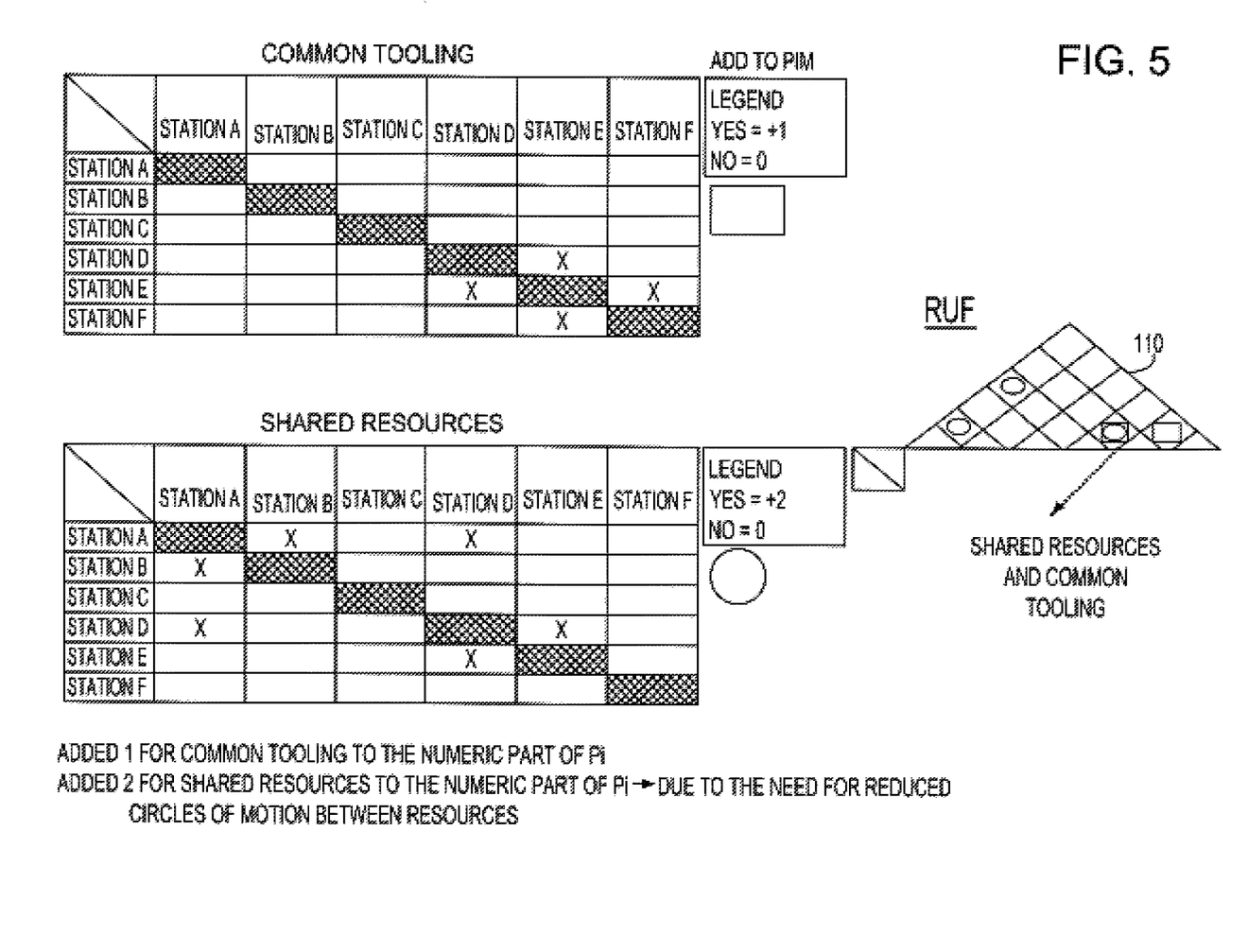
FIG. 5 depicts construction of a RUF of the invention for tracking factors relating to shared resources and common tooling factors.

FIG. 5 depicts more detailed operation of the resource utilization factor (RUF) function 110, initially introduced with respect to FIG. 1B herein. RUF 110 operation is based on shared resources and tooling that is implemented by the novel method of optimizing of the invention. For example, a value of 2 is added to the PI when the tools are shared, whereas a value of 1 is added in the case where resources are shared. Once the RUF 110 is constructed with an eye towards common tooling and shared resources, the next stage of the inventive process is the creation of the BACE functionality 130.

Figure 6:
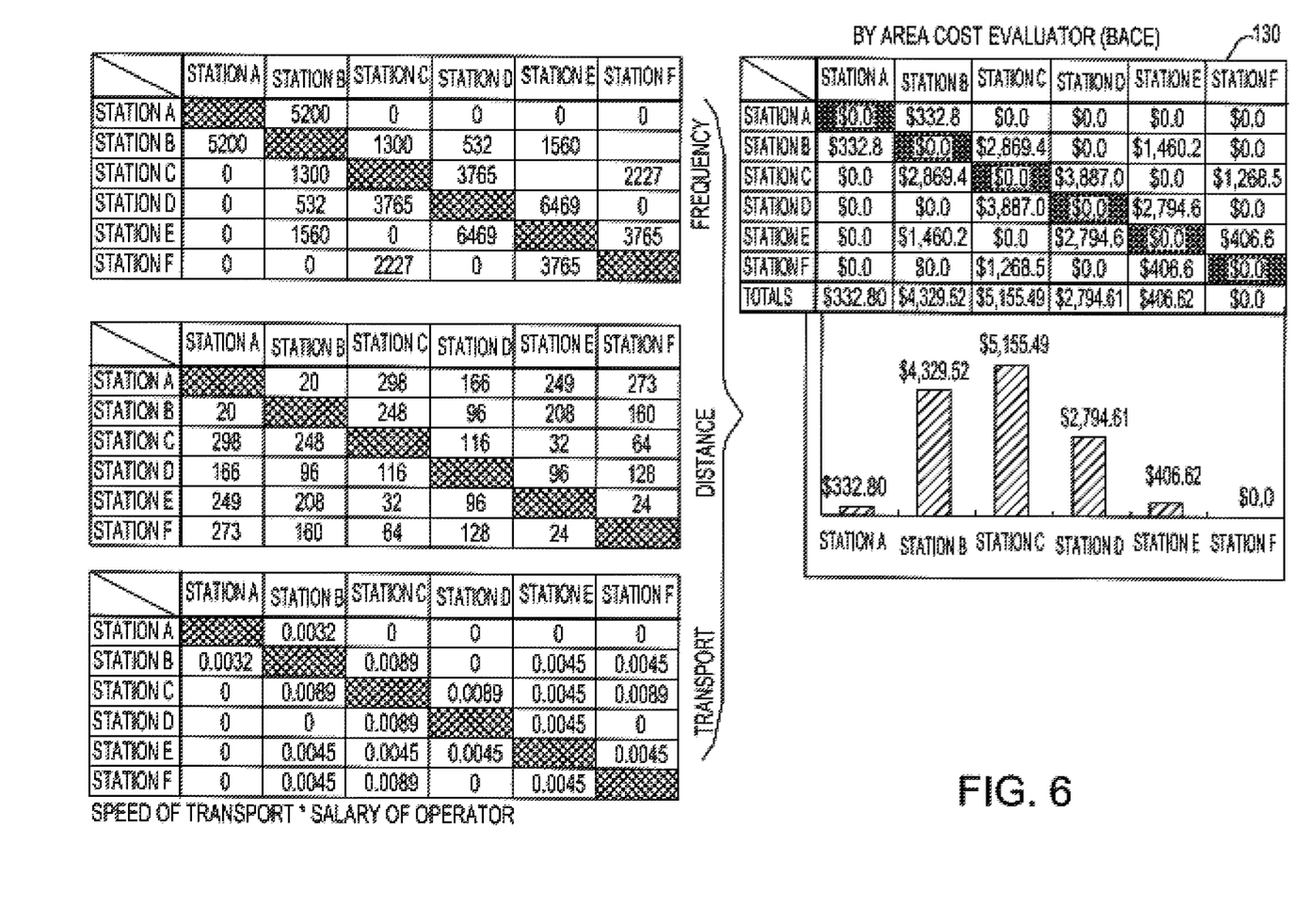
FIG. 6 is a view generated by the novel method that reflects costs attributed to various operations for required transport modes.

The "By area cost evaluator" or BACE 130 as shown in FIG. 6 calculates distances and frequencies for the PI in accordance with: ByAreaCost (per year, in $)=[frequency of traversing the distance (per year)]*[distance (feet)]*[cost (Transport_Type)], whereby the costs are estimated based on the transport mode (band cart/conveyor etc.), and recorded in dollars per foot ($/ft.). The total cost for a particular floorplan layout is preferably estimated for annual time periods.

Figure 7:
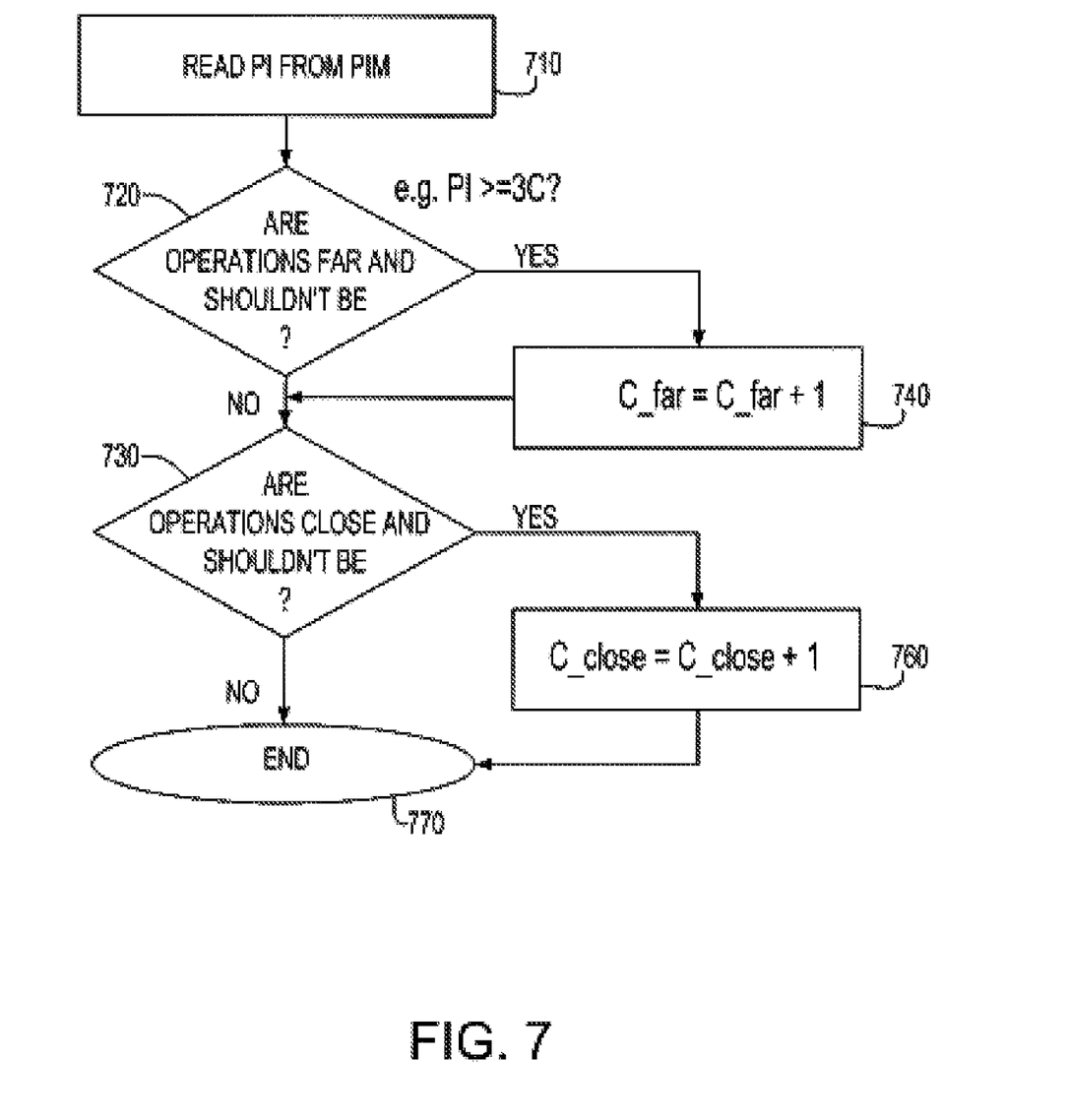
FIG. 7 identifies an algorithm used by the invention to identify opportunities for optimizing the factors affecting the various operational functions and tasks comprising the organizational activity.

One of the key features or benefits of the method for optimizing of the invention includes the ability to analyze and identify potential improvement actions for optimizing the floorplan layout, e.g., manufacturing floorplan layout or re-layout. The proposed or found opportunities, if acted upon and incorporated the floorplan layout or re-layout result in measurable improvements in operational efficiency. FIG. 7 herein depicts a system flow diagram highlighting the steps required for identifying opportunity for improvement vis-à-vis the layout modifications, including identifying opportunities for adjusting the proximity factors.

Block 710 of the FIG. 7 flowchart represents a step of reading the calculated PI from the PIM. Block 720 represents a decision step of identifying whether the operations under study are presently implemented with distances that are farther apart than they should be under optimal operating conditions. If no, program flow control moves to decision block 730. If yes, the flow control moves to block 740, where C_far is modified incrementally to C_far+1. Decision block 730 determines whether operations are "far." If not, program flow ends at block 750. If yes, program flow moves to block 760, where C-close is incremented to C_close+1. If no, program flow ends at block 770.

Figure 8A:
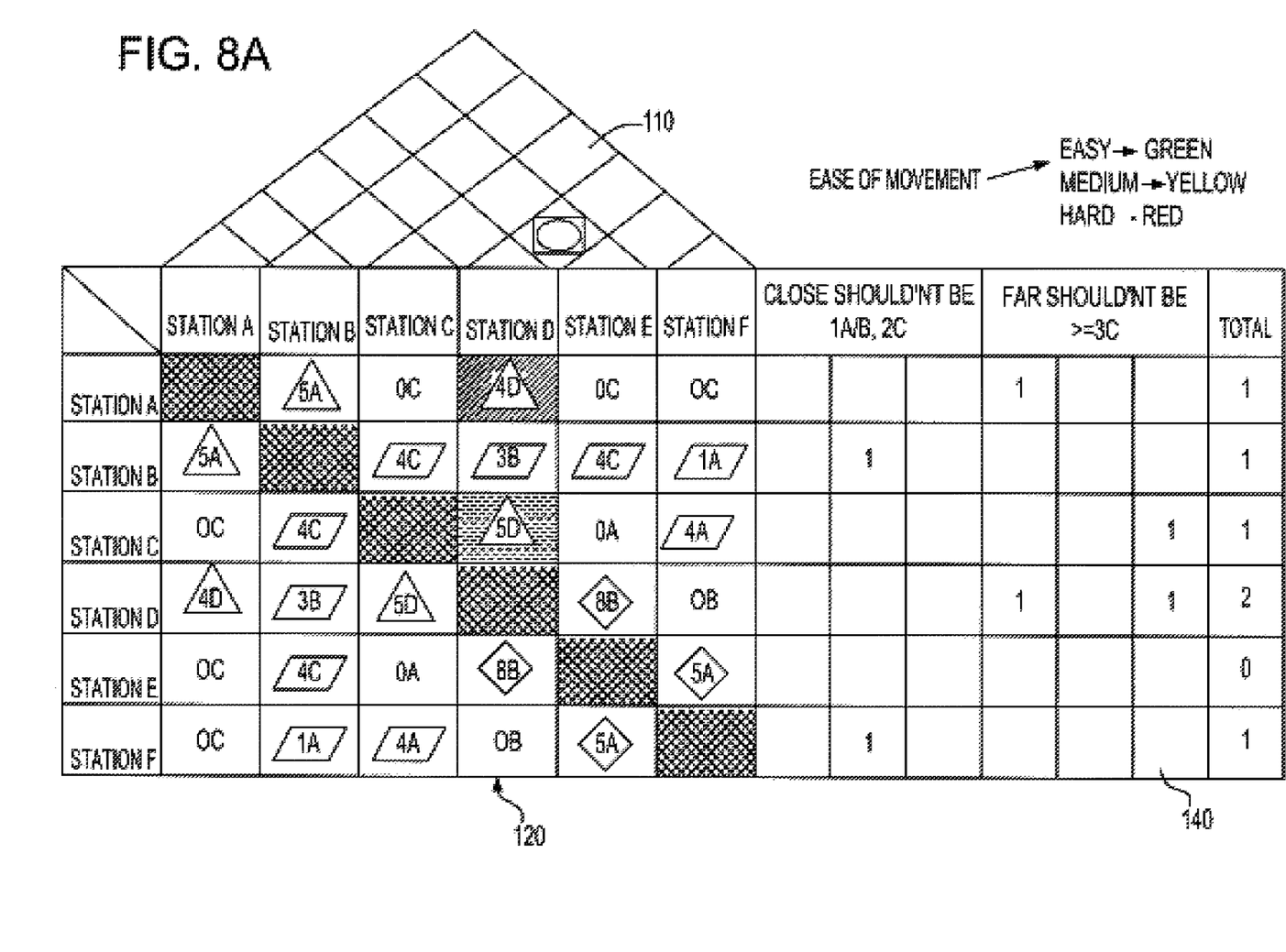
FIGS. 8A and 8B together depict an opportunities table of the invention, qualifying the opportunities available for optimizing the various tasks and factors comprising the operations.

Hence, potential opportunities (as mentioned) are identified by the set of steps with respect to the closeness of operations implemented in the layout. For example, operations that are slated for execution in close proximity that do not need to be so close are identified, or operations or stations that are deemed far away when the operations should be close to each other. Moreover, the end user may use the process to customize a range of PIs, which range includes varying values that fall into this category. One other factor that is added to the matrix is the ease of movement between stations to carry out operations. In the PI, three levels that correspond to qualifying the efforts required as hard to move, moderate to move and easy to move may be identified in the user interface with the colors red, yellow and green, respectively. These indicators are included and displayed within the Opportunities Analysis Table (OAT) of FIG. 8A for ready visibility, where opportunities are highlighted as shown.

Figure 8B:
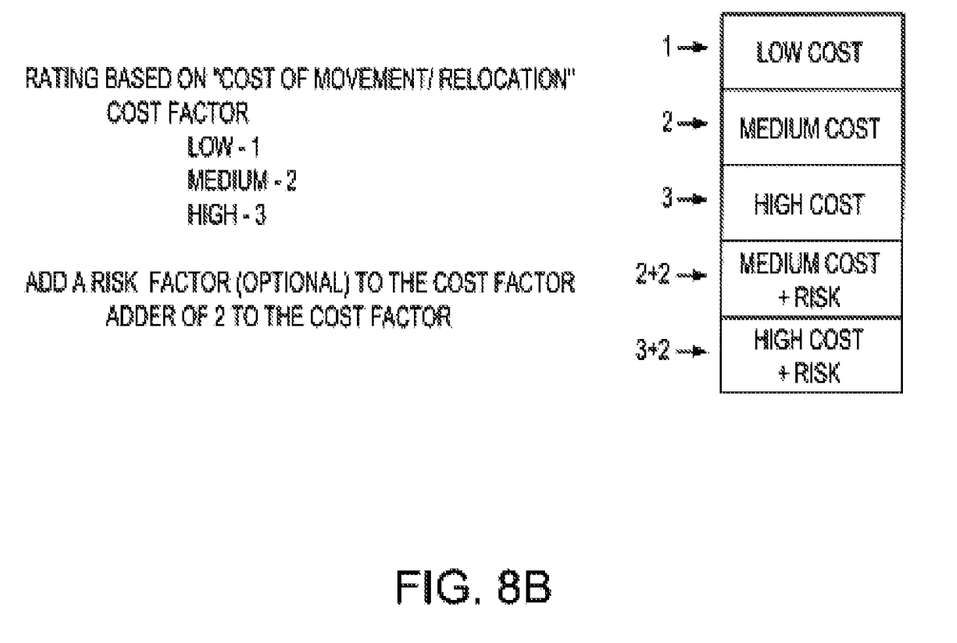

FIG. 8B shows the legends and ratings generated in an exemplary analysis implemented by the invention with respect to a server assembly area. The method was found to identify six (6) opportunities using the compiled PI, which opportunities may be seen in FIG. 8B. The opportunities are thought to be implementable by making approximately 16 changes to the layout of the exemplary floorplan layout under analysis by the invention.

Figure 9:
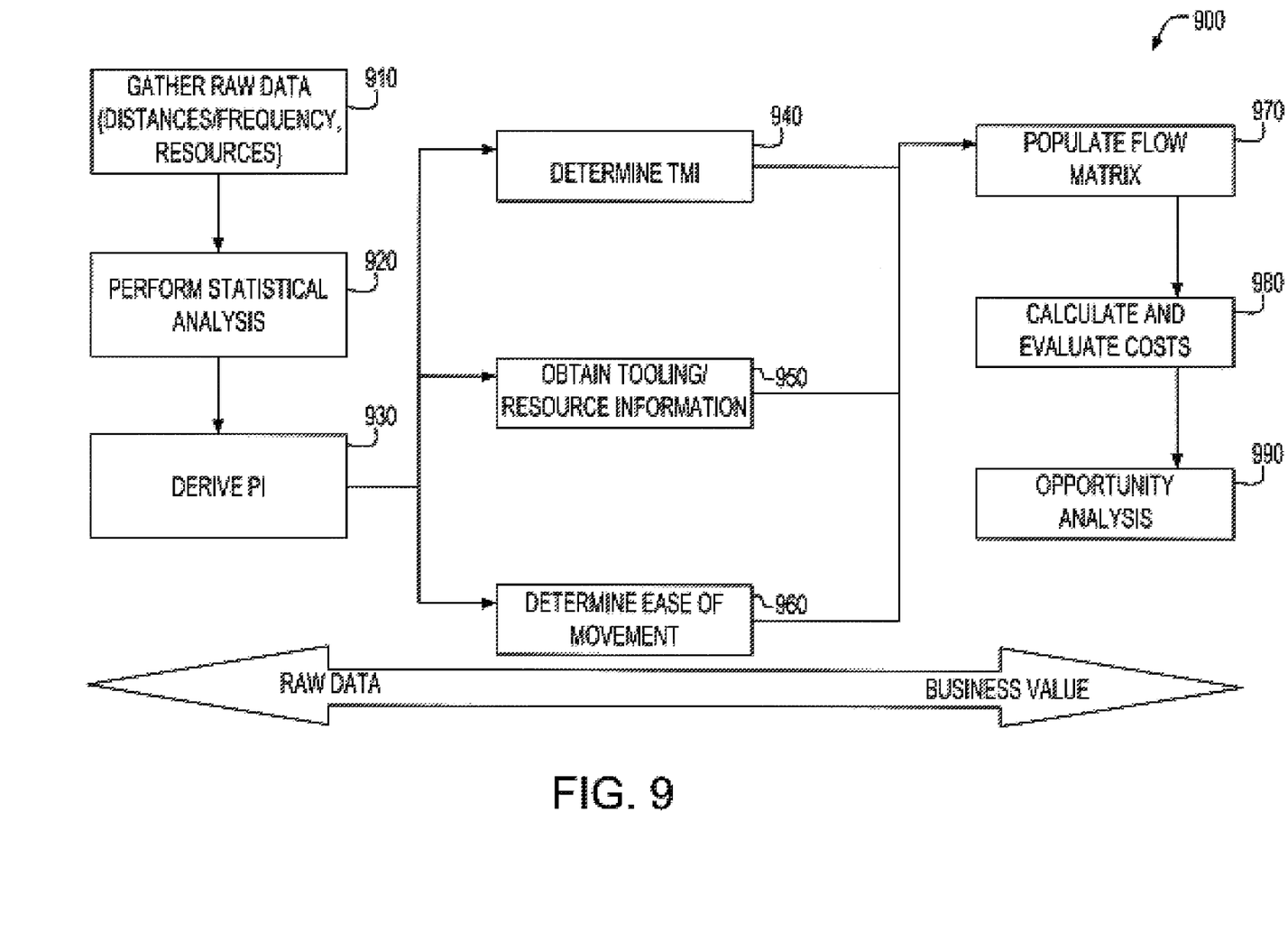
FIG. 9 depicts one embodiment of a method 1000 for implementing the present invention.

FIG. 9 depicts one embodiment of a method 900 of the invention. A first step of method 900 includes the gathering the raw data that defines the floorplan layout for analysis, which is identified in the figure as block 910. A step of performing a statistical analysis is identified as block 920 in the figure. A step that calculates or derives the proximity index or PI is identified as block 930 in the figure.

The PI calculation step (930) includes three sub-steps. The first of the three sub-steps, identified as block 940 in FIG. 9, is carried out to determine the transport mode indicators, or TMIs. A step that includes obtaining tooling and resource information is identified in FIG. 9 as block 950. A sub-step for determining the ease of movement by the proposed floorplan is identified as block 960 in the figure. Block 980 represents a step of populating the RUF and PIM by the inventive method, and block 980 represents the step of calculating and evaluating costs. The sub-step includes populating the BACE with the transport costs.

Block 990 represents a step of analyzing the opportunities realized by the inventive operation, including quantifying the benefits that might be realized through implementation of the suggested modifications. It identifies the opportunities through various performance measures, such as work in process (WIP), cycle time (CT), etc. As should be readily understandable by a review of FIG. 9, the method takes in the raw data and outputs through the user interface the factors that can be adjusted to add business value, or optimize productivity and flow through in the modified floorplan layout and operations conducted within the constraints of the modified layout.

While it is apparent that the invention herein disclosed is well calculated to fulfill the objects stated above, it will be appreciated that numerous modifications and embodiments may be devised by those skilled in the art and it is intended that the appended claims cover all such modifications and embodiments as fall within the true spirit and scope of the present invention.

What is claimed is:

1. A computer-automated method for analyzing an organizational floorplan layout, and making recommendations for modifying the organizational floorplan layout to optimize productivity and efficiency of operations conducted within the modified organizational floorplan layout, the method including steps of:
    gathering raw performance measure data comprising performance measures known to quantify productivity and efficiency of operations of the organizational floorplan layout;
    comparing different areas in the organizational floorplan layout, and generating proximity data as a result of the comparing;
    comparing different resources needed to carry out planned operations, and their interdependencies,
    using a controller of a computer system for calculating and evaluating costs associated with operating in accordance with the organizational floorplan layout, and generating cost data as a result of the calculating and evaluating;
    identifying opportunities for modifying the organizational floorplan layout; and
    recommending layout modifications based on the identified opportunities.

2. The computer-automated method for analyzing as set forth in claim 1, wherein the step of comparing different areas includes generating a process interrelationship matrix (PIM) to present said proximity data.

3. The computer-automated method for analyzing as set forth in claim 2, wherein the step of generating the PIM includes generating and using a proximity index (PI) to identify proximity of operation conducted in accord with the organizational floorplan layout under analysis.

4. The computer-automated method for analyzing as set forth in claim 2, wherein the step of generating the PIM includes generating a transport mode indicator (TMI) matrix to identify transportation measures needed to conduct operations in accord with the organizational floorplan layout under analysis.

5. The computer-automated method for analyzing as set forth in claim 2, wherein the step of generating the PIM includes determining an ease of movement of operations to be conducted in accord with the organizational floorplan layout under analysis.

6. The computer-automated method for analyzing as set forth in claim 2, wherein the step of generating the PIM includes comparing operational area-to-operational area and generating an alphanumeric pairing scheme to reflect results of the comparing.

7. The computer-automated method for analyzing as set forth in claim 6, wherein the step of recommending includes using transportation mode indicator symbols, which indicate various modes of transportation for use in operations within the organizational floorplan layout under analysis.

8. The computer-automated method for analyzing as set forth in claim 2, wherein the alphanumeric paring scheme includes using an alpha rating scale that relates to nearness of operational stations within the organizational floorplan layout under analysis.

9. The computer-automated method for analyzing as set forth in claim 1, wherein the step of using the controller for calculating and evaluating costs includes populating a by-area cost evaluation (BACE) matrix with identified transport costs.

10. The computer-automated method for analyzing as set forth in claim 1, further including that the step of recommending includes generating an opportunity analysis table (OAT) for end-user review.

11. The computer-automated method for analyzing as set forth in claim 1, wherein the step of gathering includes gathering data for distances, frequency of operation, resources allocation and sharing opportunities, tooling and transport type includes provided same measures data in a form of text or CSV files.

12. A computer program product comprising:
a tangible storage medium readable by a processing circuit and storing instructions for execution by the processing circuit for performing a method for analyzing an organizational floorplan layout and making recommendations for modifying the organizational floorplan layout, the method comprising steps of:
gathering raw performance measure data comprising performance measures known to quantify productivity and efficiency of operations of the organizational floorplan layout;
comparing different areas in the organizational floorplan layout, and generating proximity data as a result of the comparing;
comparing different resources needed to carry out planned operations, and their interdependencies,
calculating and evaluating costs associated wit operating in accordance with the organizational floorplan layout, and generating cost data as a result of the calculating and evaluating;
identifying opportunities for modifying the organizational floorplan layout; and
recommending layout modifications based on the identified opportunities.

13. The computer program product as set forth in claim 12, wherein the step of comparing different areas includes generating a process interrelationship matrix (PIM) to present said proximity data, including:
generating and using a proximity index (PI) to identify proximity of operation conducted in accord with the organizational floorplan layout under analysis;
generating the PIM includes generating a transport mode indicator (TMI) matrix to identify transportation measures needed to conduct operations in accord with the organizational floorplan layout under analysis; and
determining an ease of movement of operations to be conducted in accord with the organizational floorplan layout under analysis.

14. A computer system, comprising:
a controller for analyzing a manufacturing plant layout and making suggested recommendations for modifying the manufacturing plant layout to optimize productivity of manufacturing operations carried out based on the manufacturing plant layout, wherein the controller executes a method comprising the steps of:
analyzing data comprising a set of layout measures known to affect manufacturing cycle times and productivity;
qualifying each measure of the set of layout measures based on a result of said analyzing; and
generating a set of recommendations for modifying the manufacturing plant layout based on the results of the qualifying in order to optimize productivity of manufacturing operations in the modified manufacturing plant layout.

15. The computer system as set forth in claim 14, wherein the step of analyzing includes that the set of layout measures include: current proximity, area or process interdependency, resource sharing and dependencies, transportation costs, ease of relocation and optimization opportunities.

16. The computer system as set forth in claim 15, wherein the step of generating includes generating recommendations for improving resource allocation efficiency and utilization, improving material flow before, during and after the manufacturing cycle, and improved flexibility and responsiveness to changing conditions within markets for manufactured products.

17. The computer system as set forth in claim 16, wherein said step of generating includes providing said recommendations in a data format that facilitates WIP, cycle time and throughput analyses.

18. The computer system as set forth in claim 17, wherein the step of qualifying includes use of a Proximity Index.

19. The computer system as set forth in claim 17, wherein the step of qualifying includes providing a single clear view of relevant factors affecting productivity at the manufacturing plant layout.

20. The computer system as set forth in claim 19, where the single clear view comprises a user interface.

* * * * *